July 23, 1940.　　　　E. C. SULZMAN　　　　2,208,689
AUTOMATIC CARBURETOR DEICING SYSTEM
Filed Jan. 8, 1938
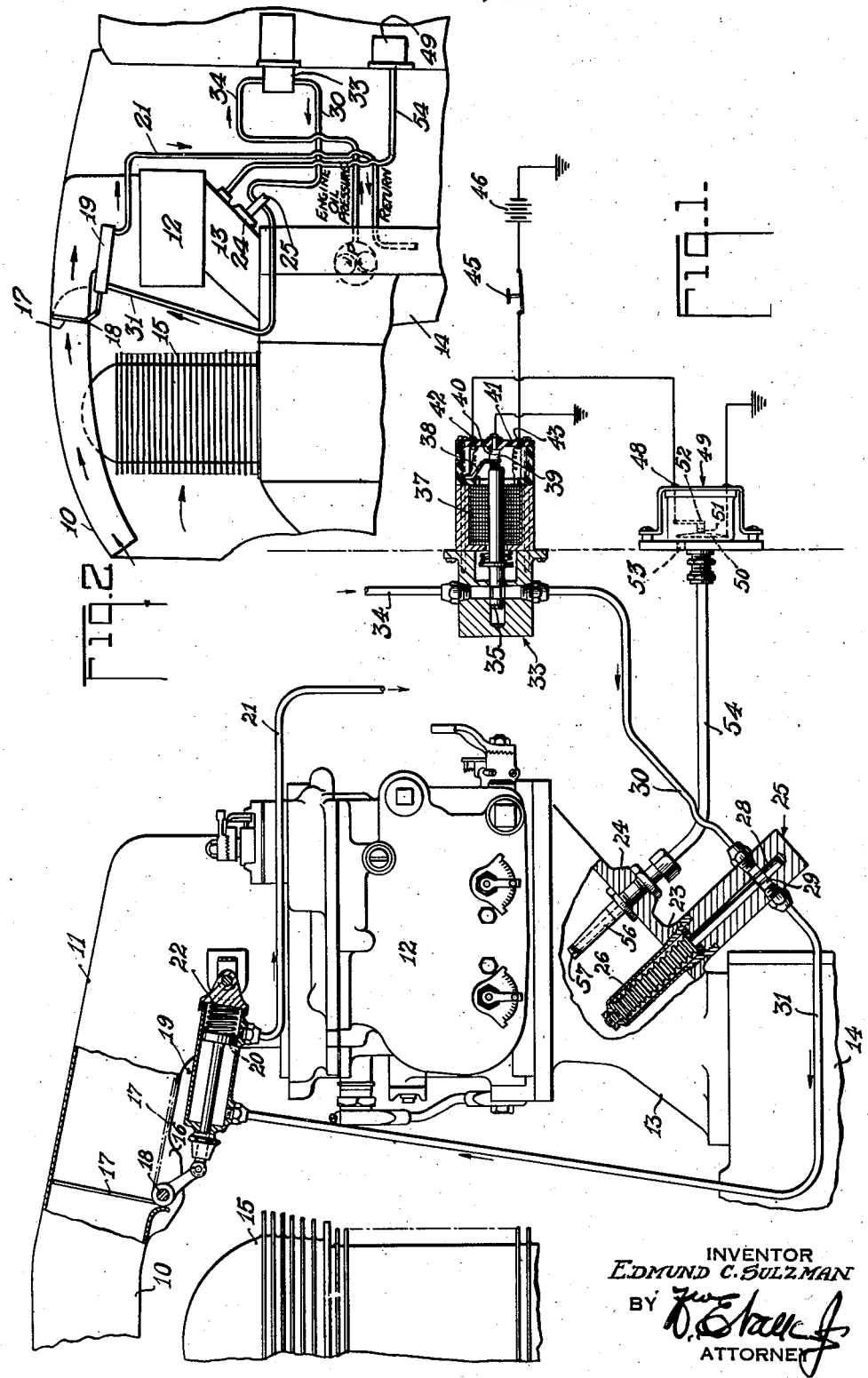
INVENTOR
EDMUND C. SULZMAN
BY
ATTORNEY Patented July 23, 1940

2,208,689

UNITED STATES PATENT OFFICE 2,208,689

AUTOMATIC CARBURETOR DEICING SYSTEM

Edmund C. Sulzman, Caldwell, N. J., assignor to Wright Aeronautical Corporation, a corporation of New York Application January 8, 1938, Serial No. 183,991

5 Claims. (Cl. 123—122)

This invention relates to internal combustion aircraft engines and comprises particularly a combination of apparatus to afford air temperature control and automatic elimination of icing in the induction system of the engine.

One of the problems currently encountered in aircraft engine operation is the formation of ice in the induction system, particularly in the vicinity of the carburetor, which ice may accumulate to constrict the induction system openings and produce other effects to the detriment of engine power output. This ice formation is known to occur under certain combinations of temperature and humidity in the atmosphere, and it is generally known that if the fuel-air mixture after passing through the carburetor is maintained at a level of 35° F. or more, ice will not form anywhere in the induction system. With modern supercharged engines it is desired to hold the intake temperatures as low as possible to attain greater volumetric efficiency in the engine. This does not interfere with the proper carburization since fuel sprayed into the entering air is thoroughly atomized by passage through the supercharger and, there is a temperature rise in the supercharger itself, so that the charge entering the cylinders is actually somewhat warmer than the air in the vicinity of the carburetor. If the humidity conditions are favorable, entering air temperatures may be very much lower than freezing or in the freezing zone without danger of ice formation. It is only during a certain critical range of temperature and humidity, as above indicated, that ice formation takes place.

In the prior art, means have been provided to indicate the presence of ice in the induction system. Likewise, means have been provided to control the temperature of the entering air. To my knowledge, however, there has been no coordinated system whereby the temperature of entering air is automatically adjusted to a non-icing level in response to the formation of ice. It is therefore, an object of this invention to provide an automatic-deicing system for the engine induction system. An associated object is to so arrange the apparatus that normally, cold air is permitted to enter the engine intake, and to provide means, active only when ice formation commences, to raise the temperature of the air entering the system, to the elimination of the ice and to the prevention of further ice formation while icing conditions persist in the atmosphere. A further object is to provide means responsive to icing which will establish air temperature control in the engine intake and will maintain this control until same is cut out by selective manipulation by the aircraft crew.

Further objects will be apparent in reading the annexed detailed description in connection with the drawing, in which Fig. 1 indicates an engine carburetor incorporating the several devices which comprise the invention, and Fig. 2 is an elevation showing the devices associated with a conventional cowled-in aircraft power plant.

I have indicated the carburetor and the devices of the invention partly in full lines and partly in section, electrical connections being shown diagrammatically for the sake of clarity. 10 represents an air intake scoop open to the ambient air, directly connected with an air intake duct 11 bolted to a carburetor 12 which in turn is attached to an adapter 13 fixed to an engine 14. Since engine induction systems are generally well-known, the engine and details of the induction passages are not shown and form no particular part of this invention. However, I do indicate an engine cylinder 15 which is normally ahead of the carburetor and serves in connection with the other engine cylinders as a means for warming air passing between the engine cylinders so that the air rearward of the cylinders is at elevated temperature. This applies particularly in the case of aircooled engines. In the duct 11, I provide a port 16 opened to the zone in the rear of the engine cylinders and a gate valve 17, pivoted at 18 may be moved between the full and dotted line positions, respectively to close the scoop 10 and to close the opening 16. When the valve 17 closes the scoop 10, warm air enters the port 16 and passes to the carburetor. Conversely, when the gate 17 closes the port 16, cold air enters the scoop 10 and passes to the carburetor. The gate valve 17 is moved by a piston-cylinder combination 19 and is so arranged that when fluid under pressure is fed to the cylinder, the valve 17 closes the scoop 10 and when pressure is relaxed, fluid bleeds through an orifice 20 in the piston and is returned to the engine through the pipe 21, the piston moving the valve 17 to the port closing position by a spring 22.

In the adapter 13 are bosses 23 and 24, the former accommodating a temperature responsive fluid valve 25 including an expansible diaphragm 26 contacted by the air stream passing through the adapter. Upon relative expansion and contraction of the diaphragm 26, a plunger 28 is moved to open and close a passage 29 between a pipe 30 and a pipe 31, the latter being connected to the piston-cylinder unit 19. The degree of opening between the pipes 30 and 31 will be governed by temperatures existing in the adapter 13. The pipe 30 is connected to a shut-off valve 33, the latter in turn being connected by a pipe 34 to a source of fluid under pressure such as the engine lubricating system, not shown. A plunger 35 operates in the housing of the valve 33 either to open or to close the valve to respectively establish or prevent fluid passage from the pipe 34 to the temperature responsive valve unit 25. The valve stem 35 is extended to the right, as shown, to comprise an armature for a solenoid 37, the right hand end of the stem 35, when the valve is open, striking a resilient leaf 38 to effect closure of a switch comprised by the contact points 39 and 40. The contact point 39 is carried by the element 38, while the contact point 40 is mounted upon a cover plate 41. The element 38 is connected to one end of the solenoid winding, said end likewise being connected to a terminal 42. The other end of the solenoid winding is connected to a terminal 43. It will be seen that the terminal 43 is connected through a circuit breaker 45 and a power source 46, to ground. The terminal 42 is connected to a terminal 48 of a diaphragm switch 49, the other terminal of said switch as shown, being grounded. This diaphragm switch 49 comprises an expansible diaphragm 50 carrying a switch point 51 which engages, under relative high pressure conditions within the diaphragm, with a fixed switch point 52 connected to the terminal 48. The interior of the diaphragm is vented through a small aperture 53 and is connected by a tube 54 to a tube 56 mounted on the adapter boss 24, the tube 56 having a small Venturi opening at its inner end 57 which is exposed to the air flow passing through the adapter.

The operation of the apparatus is as follows:

We may assume that at the outset, ice conditions do not exist, and that the valve 17 is adjusted to cover port 16 permitting cold air flow into the carburetor. Under this condtion, the opening 57 in the tube 56 will be clear and the low pressure from the venturi will be communicated to the diaphragm 50, separating the switch points 51 and 52, thus, the valve 33 will be closed and the temperature responsive valve 25 will be inactive and will have no control upon the valve 17. Now, if icing conditions are encountered, ice will form on the end of the tube 56, closing the small opening 57 in same whereupon the low pressure or vacuum in the diaphragm 50 is relieved by air passing through the vent 53. The switch points 51 and 52 will contact to close the solenoid circuit through the terminal 42, the terminal 43, the normally closed circuit breaker 45, the power source 46, and ground. With the solenoid energized, the valve stem 35 will move to an opening position permitting of fluid flow to the valve unit 25 as shown. Since low temperature conditions exist in the adapter 13, and since the unit 25 is initially adjusted to maintain a temperature of approximately 35° F. In the adapter, the valve 25 will be opened and will permit fluid flow to the piston-cylinder unit 19 to raise the gate valve 17 to the position shown in full lines.

Reverting now to the solenoid valve 33, as soon as the stem 35 moves to the right, the contacts 39 and 40 are closed to short circuit the diaphragm switch unit 49 with consequent maintenance of the valve stem 35 in the valve opening position. Warm air will pass through the port 16 to the carburetor intake and, as the temperature rises in the adapter 13, the temperature responsive valve unit 25 will control oil flow through the valve and will consequently adjust the valve 17 to a proper intermediate position whereat the 35° temperature is maintained in the adapter, by an admixture of cold and warm air respectively entering the scoop 10 and the port 16. The warm air in the adapter 13 will have dissolved the ice from the tube 56 to open the contacts 51, 52 but temperature control by virtue of the valve continues since the valve unit 33 remains open to maintain the temperature at approximately 35° F. After a reasonable interval of time, a member of the aircraft crew may operate the circuit breaker 45 by which the solenoid is de-energized and the pressure fluid is cut-off from the valve 25 and the piston-cylinder unit 19. This will return the system to the full cold air condition with the valve 17 covering the port 16. If the icing condition in the atmosphere has ceased, the apparatus will stay in the cold air adjustment, but if the icing condition still exists, ice will form on the tube 56 and the system will be readjusted for temperature control by the temperature responsive valve unit 25. Thus, the air craft crew may occasionally operate the circuit breaker 45 to return the system to the cold air adjustment but the system will automatically respond to ice conditions when such are encountered.

If desired, an ice indicator in the form of a light or the like may be connected in the circuit with the diaphragm unit 49 to serve as a visual warning of the presence of ice.

It will be obvious to those skilled in the art that the several units 25, 56, 33 and 49 may be consolidated into a single piece of apparatus or may be rearranged in two or three pieces of apparatus to provide for greater compactness and to allow for integral electrical or hydraulic connections. However, it is deemed that the functions of the several devices as shown are necessary to accomplish the desired type of temperature regulation operative in response to icing conditions. It is acknowledged that the diaphragm switch device 50 in conjunction with the tube 56 is a known combination of elements used for visual indication of icing conditions. Likewise, the temperature responsive valve 25 and the piston cylinder assembly 19 are known devices for the control of intake air temperature. However, the coordination of these units to provide for automatic temperature control only in response to icing conditions is believed to be new and this combination results in superior engine operation since, as indicated in the beginning of this description, fully cold intake air is desired at all times except when ice forming atmospheric conditions exist. The apparatus herein shown eliminates any need of attention on the part of the aircraft crew, being fully automatic in operation. Previously, a warning signal or light actuated by the tube 56 and the diaphragm switch 49 had to be interpreted by the aircraft crew who then have to take action as to proper control of temperature of air entering the engine, by the use of hydraulic or mechanical controls which are relatively complicated in their application between crew quarters and power plants of multi-engine aircraft. The simple cut-out circuit, the only selective control in this system, is simple and crew can even neglect its use for long periods without harmful effects.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In combination, in the intake system of an internal combustion engine, a valve adjustable to pass warm or cold air to the engine intake, an icing responsive device including a circuit adapted to be closed upon ice formation in the intake, an intake temperature responsive means for controlling the position of said valve including a valving device for pressure fluid, and a solenoid operated shut-off valve, the solenoid being in series in said icing responsive circuit, said shut-off valve controlling pressure fluid supply to said temperature controlling valving device.

2. In combination, in the intake system of an internal combustion engine, a valve adjustable to pass warm or cold air to the engine intake, an icing responsive device including a circuit adapted to be closed upon ice formation in the intake, an intake temperature responsive means for controlling the position of said valve including a valving device for pressure fluid, and a solenoid operated shut-off valve, the solenoid being in series in said icing responsive circuit, said shut-off valve controlling pressure fluid supply to said temperature controlling valving device, said solenoid circuit including contacts organized to short circuit said icing responsive device after initial solenoid energization thereby.

3. In combination, in the intake system of an internal combustion engine, a valve adjustable to pass warm or cold air to the engine intake, an icing responsive device including a circuit adapted to be closed upon ice formation in the intake, an intake temperature responsive means for controlling the position of said valve including a valving device for pressure fluid, a solenoid operated shut-off valve, the solenoid being in series in said icing responsive circuit, said shut-off valve controlling pressure fluid supply to said temperature controlling valving device, said solenoid circuit including contacts organized to short circuit said icing responsive device after initial solenoid energization thereby, and a manual circuit breaker in said solenoid circuit.

4. In combination with an internal combustion engine intake system, an ice warning indicator including an electric circuit having therein a solenoid, a fluid valve operated by said solenoid, hydraulic means for varying the intake air temperature operated by fluid pressure, and a fluid supply connection to said hydraulic means passing through said fluid valve.

5. In combination with an internal combustion engine intake system, an element in the intake having a normally clear opening subject to closure by and upon formation of ice on the element, a normally inactive intake air temperature regulator operative when active to control entering air to a temperature above that at which ice may form in the intake, means responsive to closure of said opening by ice for starting and thereafter perpetuating operation of the regulator, such perpetuation taking place regardless of the presence or absence of ice on the element, and a selective manual control device for stopping operation of the regulator.

EDMUND C. SULZMAN.